(12) United States Patent
Okamoto

(10) Patent No.: US 6,625,314 B1
(45) Date of Patent: Sep. 23, 2003

(54) ELECTRONIC PEN DEVICE AND CHARACTER RECOGNITION METHOD EMPLOYING THE SAME

(75) Inventor: Masayoshi Okamoto, Kyoutanabe (JP)

(73) Assignee: Sanyo Electric Co., LTD, Osaka (JP)

( * ) Notice: Subject to any disclaimer, the term of this patent is extended or adjusted under 35 U.S.C. 154(b) by 0 days.

(21) Appl. No.: 09/401,989

(22) Filed: Sep. 23, 1999

(30) Foreign Application Priority Data

Sep. 25, 1998 (JP) .......................................... 10-272023

(51) Int. Cl.⁷ .......................... G06K 9/00; G06K 11/18; G09G 5/00
(52) U.S. Cl. ...................... 382/188; 382/120; 382/121; 382/122; 178/19.01; 345/173
(58) Field of Search ................................ 382/119, 120, 382/121, 122, 186, 187, 188, 189; 178/18.01, 19.01; 73/862.046; 345/173; 455/556

(56) References Cited

U.S. PATENT DOCUMENTS

| | | | | |
|---|---|---|---|---|
| 4,128,829 A | * | 12/1978 | Herbst et al. | 382/120 |
| 5,548,092 A | * | 8/1996 | Shriver | 178/19.01 |
| 6,188,392 B1 | * | 2/2001 | O'Connor et al. | 178/18.01 |
| 6,229,102 B1 | * | 5/2001 | Sato et al. | 178/19.01 |
| 6,252,948 B1 | * | 6/2001 | Okamoto | 345/173 |
| 6,311,042 B1 | * | 10/2001 | DeSchrijver | 455/556 |
| 6,324,920 B1 | * | 12/2001 | DeSchrijver | 73/862.046 |

FOREIGN PATENT DOCUMENTS

| | | | | |
|---|---|---|---|---|
| JP | 6-67799 | | 3/1994 | |
| JP | 7-281827 | | 10/1995 | |
| JP | 08-272512 | * | 10/1996 | G06F/3/03 |

OTHER PUBLICATIONS

Pilot Handbook.

* cited by examiner

Primary Examiner—Mehrdad Dastouri
(74) Attorney, Agent, or Firm—Armstrong, Westerman & Hattori, LLP

(57) ABSTRACT

An electronic device used to identify loci containing more than one stroke. This electronic device utilizes a ball rotation sensor to detect the position and movement while it is in contact with a surface and an acceleration sensor when the device is not in contact with the surface. Further, this device is able to correct for inaccuracies in the acceleration sensor utilizing data received from the ball rotation sensor. This correction is based on a calculated detection error determined while the ball rotation sensor is active. The correction occurs when the device is again no longer in contact with the surface and again utilizing the acceleration sensor to determine position.

14 Claims, 13 Drawing Sheets

WRITING

RESULT OF COORDINATE DETECTION

ELECTRONIC PEN DEVICE AND CHARACTER RECOGNITION METHOD EMPLOYING THE SAME

BACKGROUND OF THE INVENTION

1. Field of the Invention

The present invention relates to an electronic pen device and a character recognition method employing the same, and more particularly, it relates to an electronic pen device allowing pen-based character entry and a character recognition method employing the same.

2. Description of the Prior Art

In general, a method of detecting the coordinates of a character handwritten on a tablet with a pen and recognizing the character on the basis of a detection result is widely known as a method of pen-based character entry. However, this method has only limited uses due to the requirement for a large-sized member, i.e., the tablet.

In this regard, various devices for inputting coordinates without employing tablets are recently proposed. For example, a pen-type input device inputting coordinates on the basis of a detection result in a ball rotation sensor provided on a pen point is proposed. For example, Japanese Patent Laying-Open No. 7-281827 (1995) discloses such an input device employing a ball rotation sensor.

FIG. 10 is a perspective view showing the appearance of the conventional input device 140 employing a ball rotation sensor disclosed in Japanese Patent Laying-Open No. 7-281827, and FIG. 11 is a sectional view showing the internal structure of the conventional input device 140 employing a ball rotation sensor shown in FIG. 10. FIG. 12 is a perspective view showing the structure of a rotation detection part of the conventional input device 140 employing a ball rotation sensor shown in FIG. 10, and FIG. 13 is a perspective view for illustrating a busy condition of the conventional input device 140 employing a ball rotation sensor shown in FIG. 10.

Referring to FIGS. 10 and 11, the conventional input device 140 employing a ball rotation sensor includes a substantially pen-shaped body part 110, a spherical rotator 112, an annular ring 136, a rotation detection part 114, an electric circuit part 132, a manual switch 134 and a cable 142. The body part 110 is in the form of a cylinder having an open lower end. The rotation detection part 114 and the electric circuit part 132 are arranged in the body part 110. The rotation detection part 114 rotatably holds the spherical rotator 112 and detects the direction and the amount of rotation of the spherical rotator 112. The annular ring 136 has a function of fixing the electric circuit part 132 and the rotation detection part 114 to the body part 110. The electric circuit part 132 amplifies outputs detected by the rotation detection part 114 and transmits the amplified outputs to a computer. The manual switch 134 is provided on the side surface of the body part 110, and employed for defining input coordinates.

With reference to FIG. 12, the detailed structure of the rotation detection part 114 is now described. The rotation detection part 114 is provided with a cylindrical case 116. A small ball 118 is set in the case 116 to rotate in correspondence to rotation of the spherical rotator 112. The small ball 118 is in contact with rollers 120 and 122 having rotation axes intersecting each other at an angle of 90°. Slit disks 124 and 126 having a number of radially extending slits formed at regular intervals are fixed to the rollers 120 and 122 respectively. An optical sensor 128 detects the direction and the amount of rotation of the slit disk 124, and an optical sensor 130 detects the direction and the amount of rotation of the slit disk 126.

Each of the optical sensors 128 and 130 includes two photodetectors arranged with a phase difference of 90° with respect to the interval between the slits and a light emitting device opposed to the two photodetectors through the slits.

In operation, the two photodetectors provided on each of the optical sensors 128 and 130 detect light passing through the slits respectively for determining the directions of rotation of the rollers 120 and 122 from the phase difference between the detected signals. The amounts of rotation of the slit disks 124 and 126 are obtained by accumulating the numbers of output pulses from the photodetectors. Further, composition of vectors of the amounts of rotation obtained by the two optical sensors 128 and 130 is performed thereby obtaining the directions and the amounts of rotation of the small ball 118 and the spherical rotator 112.

The conventional input device 140 employing a ball rotation sensor having the aforementioned structure is connected to a computer mainframe 144 through the cable 142 as shown in FIG. 13. The computer mainframe 114 includes a display part 146 and a keyboard 148. When the input device 140 is in use, the display part 146 displays a cursor (pointer) 150. This cursor 150 moves following rotation of the spherical rotator 112 of the input device 140. More specifically, the cursor 150 moves in the same direction as the direction of rotation of the spherical rotator 112 by a distance proportionate to the amount of rotation of the spherical rotator 112.

In order to input a character with the input device 140, the spherical rotator 112 provided on the pen point of the input device 140 is brought into an entry plane (plane for writing characters or the like) for writing a prescribed character with the input device 140, and the switch 134 is pressed so that the written character is input in the computer mainframe 144.

In the aforementioned conventional input device 140 employing a ball rotation sensor, however, the spherical rotator 112, which rotates when the pen point is in contact with the entry plane (contact state), does not rotate when the pen point separates from the entry plane (noncontact state). Therefore, a locus in the noncontact state cannot be detected. More specifically, when a character "+" is written as shown in FIG. 14, the locus from end coordinates 161 of the transverse line to start coordinates 162 of the vertical line cannot be detected and hence it is difficult to recognize to which one of those shown in FIGS. 15 to 17 this character belongs. In other words, it is difficult for the conventional input device 140 employing a ball rotation sensor to recognize a character, which cannot be written with one stroke, formed by a locus in a contact state and a locus in a noncontact state, although the input device 140 can detect a character, which can be written with one stroke, formed by only a locus in a contact state.

In order to cope with this problem, there has generally been proposed a method of writing a character, which cannot be written with one stroke by a general writing method, with one stroke by a specific writing method without separating a pen point from an entry plane and performing character recognition on the character written with one stroke. Such a method is disclosed in Pilot Handbook (1996 by U.S. Robotics, Inc.), Chapter 2 (Working with Pilot), pp. 22 to 31, for example. In this proposed method, however, a specific way of writing is necessary for writing a character with one stroke, and hence the writer must abandon a familiar way of writing. Consequently, this method imposes a burden on the writer, and readily leads to miswriting. Thus, it is difficult to employ this method.

As another exemplary device for recognizing a character without employing a tablet, a pen-type input device recognizing a character with an acceleration sensor is generally proposed. For example, Japanese Patent Laying-Open No. 6-67799 (1994) discloses such an input device employing an acceleration sensor. The conventional input device employing an acceleration sensor detects both of a locus in a contact state and that in a noncontact state with the acceleration sensor.

FIG. 18 is a perspective view showing the structure of a conventional input device 201 employing acceleration sensors, and FIG. 19 is a block diagram showing the electrical structure of a signal processing circuit of the conventional input device 201 employing acceleration sensors shown in FIG. 18. FIG. 20 is a schematic diagram for illustrating a busy condition of the conventional input device 201 employing acceleration sensors shown in FIG. 18.

Referring to FIG. 18, the conventional input device 201 employing acceleration sensors includes a pen body 216, an X-directional acceleration sensor 206 detecting acceleration in a direction X, a Y-directional acceleration sensor 207 detecting acceleration in a direction Y, a signal processing circuit 220 and a writing part 208. The Y-directional acceleration sensor 207 is arranged to be orthogonal to the X-directional acceleration sensor 206. The signal processing circuit 220 calculates coordinate values on the basis of the acceleration detected by the X-directional acceleration sensor 206 and that detected by the Y-directional acceleration sensor 207.

As shown in FIG. 19, the signal processing circuit 220 includes an acceleration detection part 209, an integration circuit 210, a voltage-to-frequency conversion circuit 211, a direction discrimination circuit 212 and an output circuit 213. The acceleration detection part 209 detects acceleration signals output from the X-directional acceleration sensor 206 and the Y-directional acceleration sensor 207, and the integration circuit 210 integrates the acceleration signals and converts the same to speed signals. The voltage-to-frequency conversion circuit 211 has a function of converting voltage values as the speed signals obtained in the integration circuit 210 to frequencies of pulses. In this case, the numbers of the pulses indicate the amounts of movement, and the frequencies of the pulses correspond to the velocities of movement.

The direction discrimination circuit 212 detects the directions of movement of the input device 201 on the basis of the acceleration signals detected by the acceleration detection part 209. The output circuit 213 outputs the directions and the amounts of movement input from the direction discrimination circuit 212 and the voltage-to-frequency conversion circuit 211 respectively. Output signals from the output circuit 213 are input in a personal computer 215 through an interface 214.

With reference to FIG. 20, operations of the conventional input device 201 employing acceleration sensors are now described. When a character or the like is written on a recording paper 203 with the input device 201, a display of a computer 202 displays the character or the like. More specifically, the conventional input device 201 employing acceleration sensors detects both of acceleration in a state (contact state) where a pen point is in contact with the recording paper 203 and that in another state (noncontact state) where the pen point is not in contact with the recording paper 203 when writing a character on the recording paper 203. On the basis of the values of the detected acceleration, the input device 201 calculates the amounts and the directions of movement in the contact state and the noncontact state. The input device 201 recognizes the character on the basis of the calculated directions and amounts of movement, and the display of the computer 202 displays the recognized character.

In the conventional input device 201 employing acceleration sensors, however, the acceleration sensors 206 and 207 are inferior in accuracy, particularly in detection accuracy for a fine loop and for refraction or bending, to the aforementioned ball rotation sensor in measurement of acceleration when the pen point is in contact with an entry plane. In the conventional input device 201 employing acceleration sensors, therefore, it is difficult to discriminate "y" from "g" or "U" from "V", for example.

More specifically, FIG. 22 shows a coordinate detection result obtained by the conventional input device 201 employing acceleration sensors when detecting a character "V" shown in FIG. 21. With the coordinate detection result shown in FIG. 22, it is difficult to identify whether a bottom portion 250 of the character is refracted or bent. When writing the character "V" shown in FIG. 21 and detecting this character with the input device 201, therefore, it is difficult to identify whether this character is "U" or "V".

Further, FIG. 23 shows a detection result on the locus of a circle, written with one stroke with a ruler, for example, detected by the conventional input device 201 employing acceleration sensors. Referring to FIG. 23, the start point and the end point of the circle are not connected with each other. Thus, it is understood difficult to detect a fine stroke in a contact state with the acceleration sensors 206 and 207. This example is disclosed in Transactions of the Institute of Electronics, Information and Communication Engineers (IEICE), D-I, Vol. J76-D-I, No. 10, October 1993, pp. 541 to 543, for example.

As hereinabove described, it is difficult for the conventional input device 140 employing a ball rotation sensor to detect the loci of a character, which cannot be written with one stroke, formed by a locus in a contact state and that in a noncontact state, although the input device 140 can detect the locus of a character, which can be written with one stroke, formed only by a locus in a contact state. In the conventional input device 201 employing acceleration sensors detecting both of a locus in a contact state and that in a noncontact state with the acceleration sensors 206 and 207, on the other hand, it is difficult to recognize a fine stroke in a contact state since the acceleration sensors 206 and 207 are inferior in accuracy to the ball rotation sensor.

SUMMARY OF THE INVENTION

An object of the present invention is to provide an electronic pen device capable of accurately obtaining a locus drawn on an entry plane with a pen point even if the locus cannot be written with one stroke.

Another object of the present invention is to provide a character recognition method employing an electronic pen device capable of accurately recognizing a character written on an entry plane with a pen point even if the character cannot be written with one stroke.

An electronic pen device according to a first aspect of the present invention comprises a first measuring part, a contact state determination part, a second measuring part and a movement locus operation part. The first measuring part measures movement loci of a pen point in directions X and Y on the basis of a detection result in a ball rotation sensor detecting rotation of a ball provided on the pen point. The contact state determination part determines whether the pen point is in a contact state or in a noncontact state with an entry plane. The second measuring part measures movement loci of the pen point in the directions X and Y on the basis of acceleration detected by an acceleration sensor. The movement locus operation part obtains a contact movement locus of the pen point on the basis of a measurement result in the first measuring part when the contact state determination part determines that the pen point is in the contact state with the entry plane, while obtaining a noncontact movement locus of the pen point on the basis of a measurement result in the second measuring part when the contact state determination part determines that the pen point is in the noncontact state with the entry plane.

Due to the aforementioned structure, the electronic pen device according to the aforementioned aspect obtains the contact movement locus of the pen point on the basis of the detection result in the ball rotation sensor having relatively high accuracy in the contact state of the pen point and the entry plane requiring detection of a fine stroke, while obtaining the noncontact movement locus of the pen point on the basis of the detection result in the acceleration sensor in the noncontact state where the pen point separates from the entry plane. Thus, the electronic pen device can accurately obtain movement loci, which cannot be written with one stroke, having a contact movement locus and a noncontact movement locus.

In the electronic pen device according to the aforementioned aspect, the movement locus operation part may employ end coordinates of a noncontact movement locus obtained on the basis of a measurement result in the second measuring part in the immediately preceding noncontact state as start coordinates of each contact movement locus and employ end coordinates of a contact movement locus obtained on the basis of a measurement result in the first measuring part in the immediately preceding contact state as start coordinates of each noncontact movement locus. Thus, continuity of the coordinates in the contact state and those in the noncontact state is ensured, whereby the movement loci can be readily obtained.

The electronic pen device according to the aforementioned aspect may further comprise a correction part correcting the measurement result in the second measuring part in the noncontact state on the basis of a measurement result in the first measuring part in a first period in the contact state of the pen point and the entry plane and a measurement result in the second measuring part in the first period in the contact state. Due to this structure, the correction part improves the measurement accuracy of the acceleration sensor in the noncontact state, and the movement loci of the pen point can consequently be more accurately obtained.

In the electronic pen device according to the aforementioned aspect, the contact state determination part may determine whether the pen point is in the contact state or in the noncontact state with the entry plane on the basis of a result of detection of pressing force applied from the pen point. Further, the contact state determination part may determine whether the pen point is in the contact state or in the noncontact state with the entry plane on the basis of presence/absence of rotation of a ball detected by a ball rotation sensor and presence/absence of acceleration detected by the acceleration sensor.

The electronic pen device according to the aforementioned aspect may further comprise a character recognition part recognizing a character drawn with the pen point on the entry plane on the basis of a contact movement locus for a single character obtained by the movement locus operation part. In this case, the electronic pen device may further comprise a telephone circuit for making communication with the destination of transmission/receiving, a microphone for inputting a transmission tone, a speaker for outputting a receiving tone, and a call control part obtaining a telephone number of the destination of transmission on the basis of a character string recognized by the character recognition part and outputting the obtained telephone number to the telephone circuit for allowing the telephone circuit to make a call. Due to this structure, the electronic pen device can be readily used as a portable telephone set, while the character is recognized on the basis of the accurately obtained locus and hence it is possible to effectively prevent transmission to a wrong destination.

A telephone set employing an electronic pen device according to another aspect of the present invention comprises a first measuring part, a contact state determination part, a second measuring part, a movement locus operation part, a character recognition part, a telephone circuit, a microphone, a speaker and a call control part. The first measuring part measures movement loci of a pen point in directions X and Y on the basis of a detection result in a ball rotation sensor detecting rotation of a ball provided on the pen point. The contact state determination part determines whether the pen point is in a contact state or in a noncontact state with an entry plane. The second measuring part measures movement loci of the pen point in the directions X and Y on the basis of acceleration detected by an acceleration sensor. The movement locus operation part obtains a contact movement locus of the pen point on the basis of a measurement result in the first measuring part when the contact state determination part determines that the pen point is in the contact state with the entry plane, while obtaining a noncontact movement locus of the pen point on the basis of a measurement result in the second measuring part when the contact state determination part determines that the pen point is in the noncontact state with the entry plane. The character recognition part recognizes a character drawn with the pen point on the entry plane on the basis of a contact movement locus for a single character obtained by the movement locus operation part. The telephone circuit is employed for making communication with the destination of transmission/receiving, the microphone is employed for inputting a transmission tone, and the speaker is employed for outputting a receiving tone. The call control part obtains a telephone number of the destination of transmission on the basis of a character string recognized by the character recognition part and outputs the obtained telephone number to the telephone circuit for allowing the telephone circuit to make a call.

Due to this structure, the contact movement locus of the pen point is obtained on the basis of a detection result in the ball rotation sensor having relatively high accuracy in the contact state of the pen point and the entry plane requiring detection of a fine stroke while the noncontact movement locus of the pen point is obtained on the basis of a detection result in the acceleration sensor in the noncontact state where the pen point and the entry plane separate from each other, whereby the movement loci can be accurately obtained also in the case of a character, having a contact movement locus and a noncontact movement locus, which cannot be written with one stroke. Thus, it is possible to provide a telephone set employing an electronic pen device which can effectively prevent transmission to a wrong destination by recognizing the character on the basis of the accurately obtained movement loci.

In the structure of the aforementioned telephone set employing an electronic pen device, the movement locus operation part may employ end coordinates of a noncontact movement locus obtained on the basis of a measurement result in the second measuring part in the immediately preceding noncontact state as start coordinates of each contact movement locus and employ end coordinates of a contact movement locus obtained on the basis of a measurement result in the first measuring part in the immediately preceding contact state as start coordinates of each noncontact movement locus. Thus, continuity of the coordinates in the contact state and those in the noncontact state is ensured, whereby the movement loci can be readily obtained.

In the aforementioned structure, the telephone set employing an electronic pen device may further comprise a correction part correcting the measurement result in the second measuring part in the noncontact state on the basis of a measurement result in the first measuring part in a first period in the contact state of the pen point and the entry plane and a measurement result of the second measuring part in the first period in the contact state. Due to this structure, the correction part improves the measurement accuracy of the acceleration sensor in the noncontact state, and the movement loci of the pen point can consequently be more accurately obtained. Thus, the accuracy of character recognition can be further improved, and it is consequently possible to provide a telephone set employing an electronic pen device which can further effectively prevent transmission to a wrong destination.

A character recognition method employing an electronic pen device according to still another aspect of the present invention comprises steps of detecting a movement locus of a pen point with a ball rotation sensor detecting rotation of a ball provided on the pen point, detecting a movement locus of the pen point with an acceleration sensor, and performing character recognition on the basis of detection results in the ball rotation sensor and the acceleration sensor. Due to this structure, it is possible to accurately obtain movement loci of a character, which cannot be written with one stroke, having a contact movement locus and a noncontact movement locus by obtaining a contact movement locus of the pen point on the basis of a detection result in the ball rotation sensor having relatively high accuracy in a contact state of the pen point and an entry plane requiring detection of a fine stroke and obtaining a noncontact movement locus of the pen point on the basis of a detection result in the acceleration sensor in a noncontact state where the pen point and the entry plane separate from each other. The character is recognized on the basis of the accurately obtained loci, whereby the accuracy of character recognition can be improved.

In the aforementioned character recognition method employing an electronic pen device, the step of detecting the movement locus of the pen point with the ball rotation sensor may include steps of detecting that the pen point is in the contact state with the entry plane and detecting the contact movement locus of the pen point with the ball rotation sensor in the contact state, and the step of detecting the movement locus of the pen point with the acceleration sensor may include steps of detecting that the pen point is in the noncontact state with the entry plane and detecting the noncontact movement locus of the pen point with the acceleration sensor in the noncontact state. In this structure, further, the step of detecting the contact movement locus may include a step of employing end coordinates of a noncontact movement locus obtained on the basis of a detection result in the acceleration sensor in the immediately preceding noncontact state as start coordinates of each contact movement locus, and the step of detecting the noncontact movement locus may include a step of employing end coordinates of a contact movement locus obtained on the basis of a detection result in the ball rotation sensor in the immediately preceding contact state as start coordinates of each noncontact movement locus. Thus, continuity of the coordinates in the contact state and those in the noncontact state is ensured, whereby the movement loci can be readily obtained. In the aforementioned structure, further, the character recognition method may further comprise a step of correcting the detection result in the acceleration sensor in the noncontact state on the basis of a detection result in the ball rotation sensor in a first period in the contact state of the pen point and the entry plane and a detection result in the acceleration sensor in the first period in the contact state. In this case, the detection accuracy of the acceleration sensor in the noncontact state is improved, whereby the movement loci of the pen point can consequently be more accurately obtained. Thus, the accuracy for character recognition can be further improved.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention are now described with reference to drawings.

First Embodiment

Figure 1:
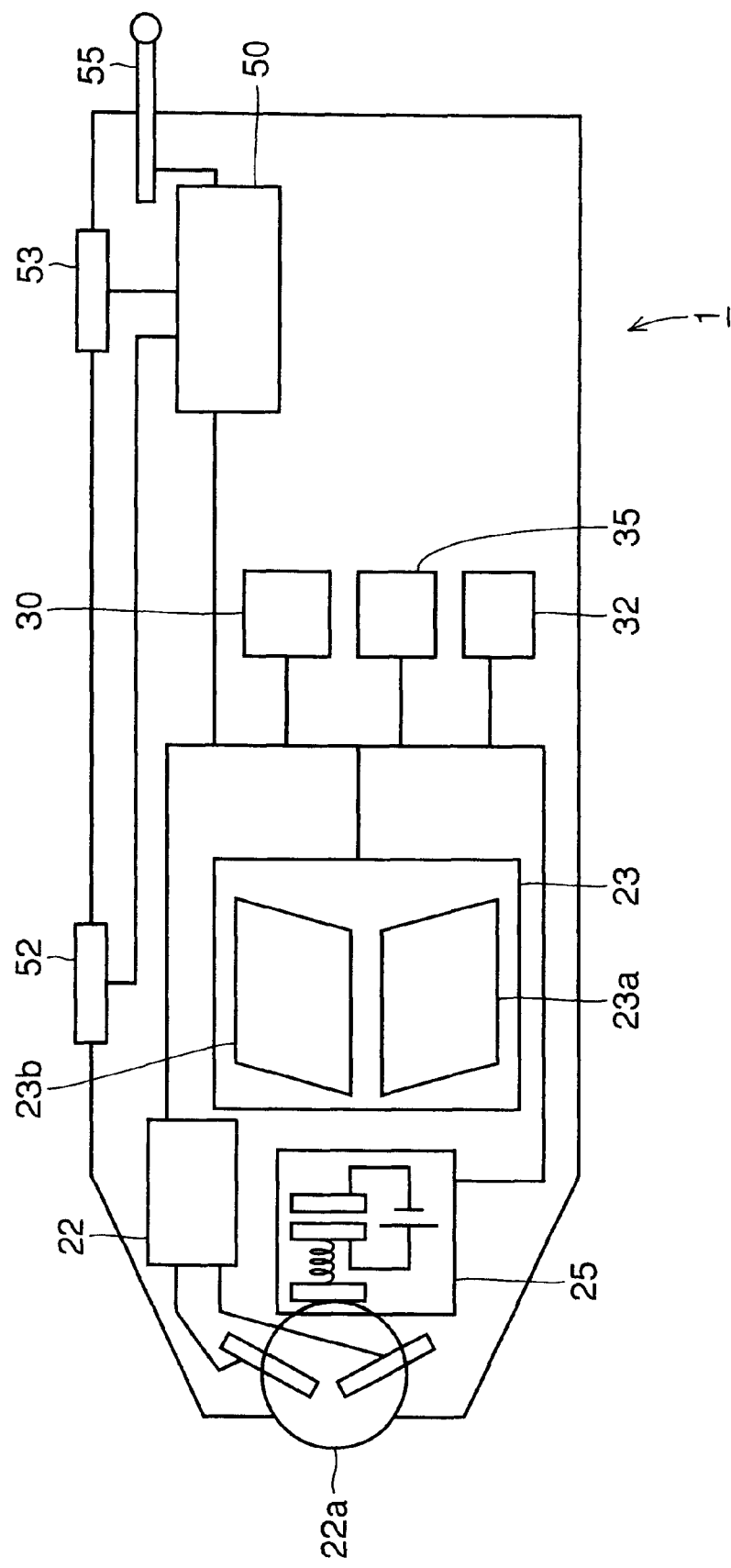
FIG. 1 is a schematic diagram showing the structure of an electronic pen device (pen-type telephone set) according to a first embodiment of the present invention.
Figure 12:
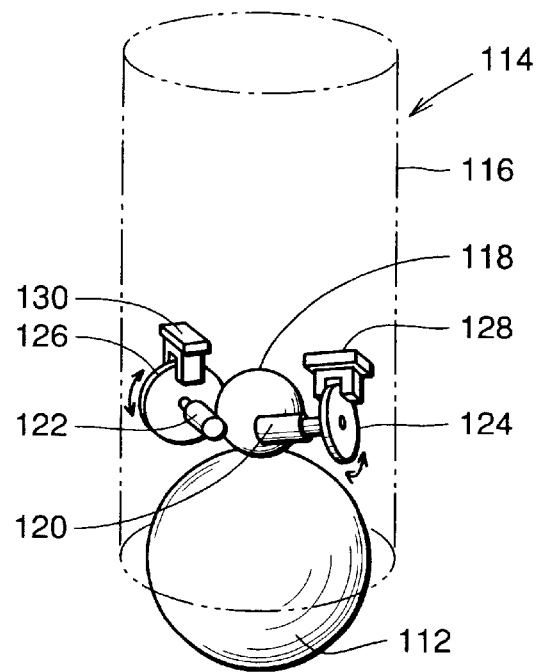
FIG. 12 is a perspective view showing the structure of a rotation detection part of the conventional input device employing a ball rotation sensor shown in FIG. 10.
Figure 13:
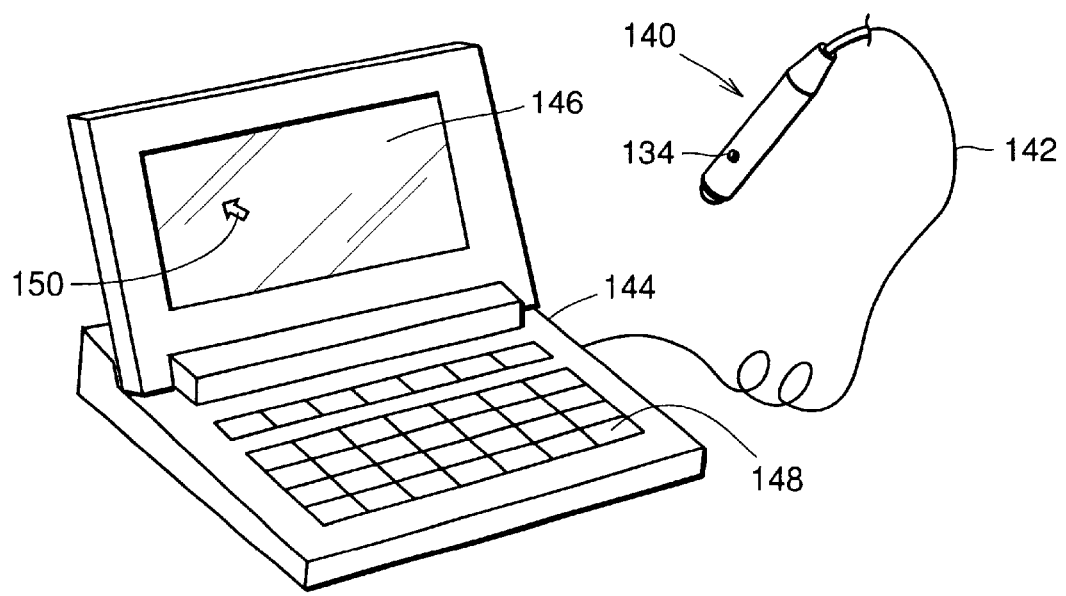
FIG. 13 is a perspective view for illustrating a busy condition of the conventional input device employing a ball rotation sensor.
Figure 14:
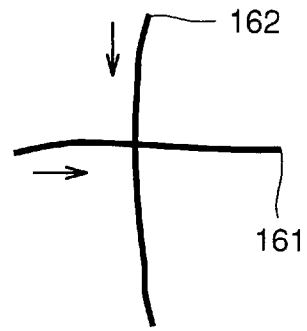
FIG. 14 is a schematic diagram showing a character hardly identifiable with the conventional input device employing a ball rotation sensor.
Figure 15:
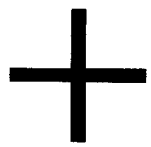
FIGS. 15 to 17 are schematic diagrams for illustrating a problem in the case of identifying the hardly identifiable character shown in FIG. 14 with the conventional input device employing a ball rotation sensor.
Figure 16:
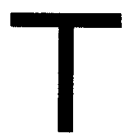
Figure 17:
Figure 18:
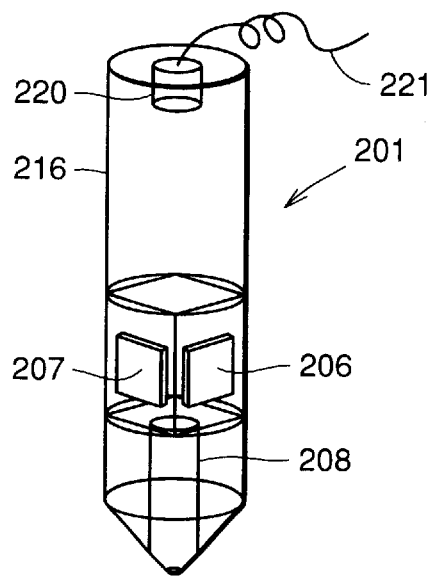
FIG. 18 is a perspective view showing the structure of a conventional input device employing acceleration sensors.
Figure 19:
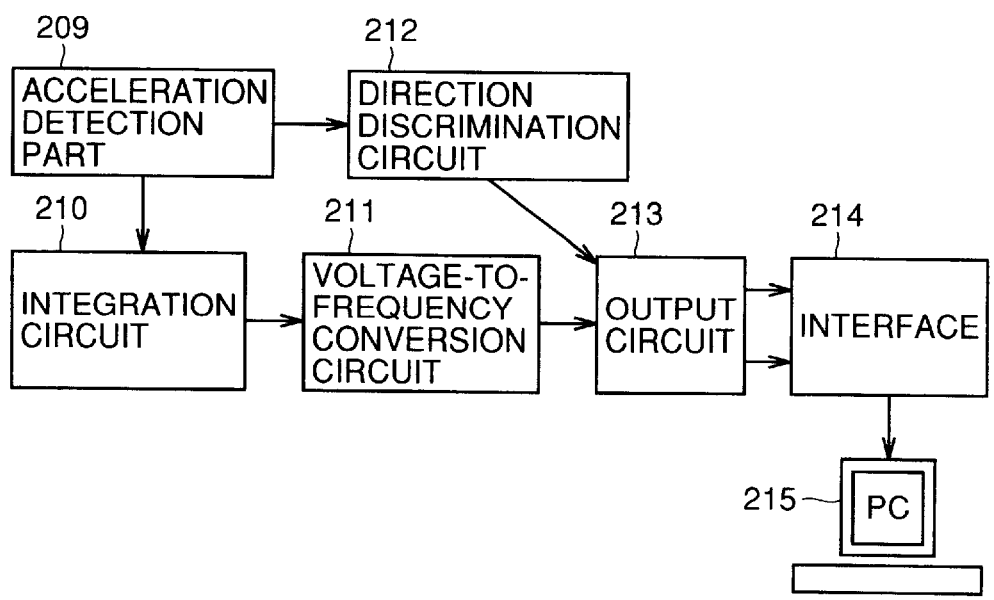
FIG. 19 is a block diagram showing the electrical structure of a signal processing circuit of the conventional input device employing acceleration sensors shown in FIG. 18.
Figure 20:
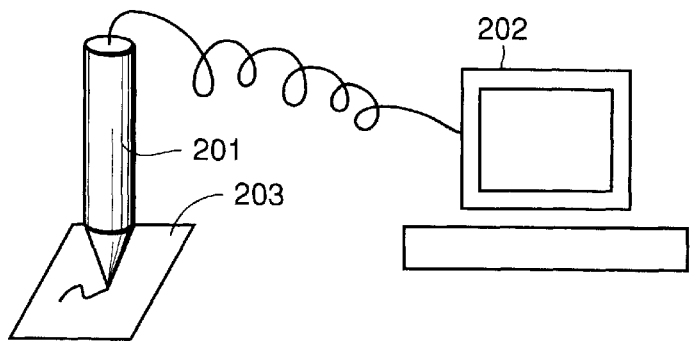
FIG. 20 is a schematic diagram showing a busy condition of the conventional input device employing acceleration sensors.
Figure 21:
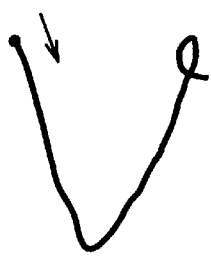
FIG. 21 is a schematic diagram showing a character hardly identifiable with the conventional input device employing acceleration sensors.
Figure 22:
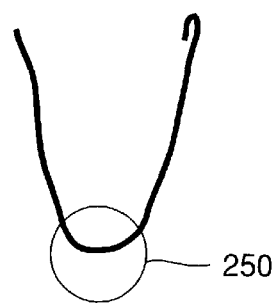
FIG. 22 is a schematic diagram for illustrating a problem in the case of identifying the hardly identifiable character shown in FIG. 21 with the conventional input device employing acceleration sensors.
Figure 23:
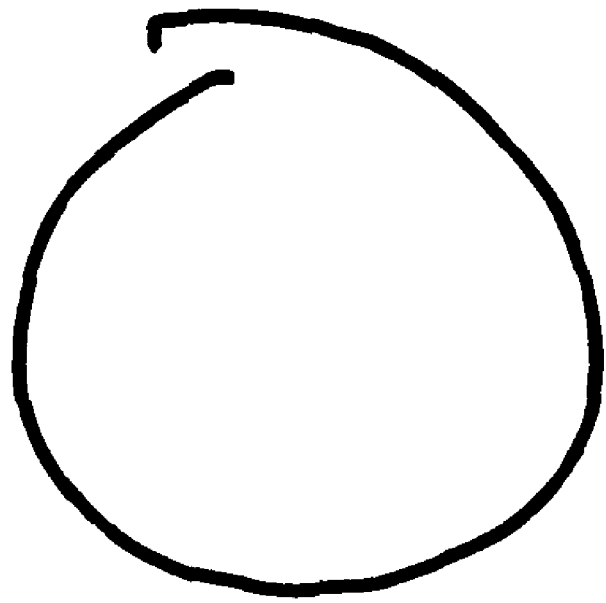
FIG. 23 is a schematic diagram showing a coordinate detection result obtained by detecting the locus of a circle drawn with one stroke with a ruler by the conventional input device employing acceleration sensors.

With reference to FIG. 1, the structure of an electronic pen device (pen-type telephone set) 1 according to a first embodiment of the present invention is described. The electronic pen device 1 according to the first embodiment includes a ball 22a rotatably provided on a pen point, a ball rotation sensor 22, a contact state determination part 25, an acceleration sensor 23, a CPU 30, a memory 32 and another memory 35. The ball rotation sensor 22 detects rotation of the ball 22a. This ball rotation sensor 22 has a structure similar to that of the ball rotation sensor part of the conventional input device shown in FIG. 12. The acceleration sensor 23 includes an X-directional acceleration sensor 23a detecting acceleration in a direction X and a Y-directional acceleration sensor 23b detecting acceleration in a direction Y.

The contact state determination part 25 detects pressing force applied to the ball 22a, thereby determining whether the pen point is in a contact state or in a noncontact state with an entry plane. The memory 32 stores a main control program, a character recognition program etc. of the CPU 30. The memory 35 stores coordinates, an acceleration correction table, a result of character recognition, a correspondence table of names and telephone numbers and the like.

The electronic pen device 1 according to the first embodiment further comprises a telephone circuit 50 for making communication with the destination of transmission/receiving, a microphone 52 for inputting a transmission tone, a speaker 53 for outputting a receiving tone, and an antenna 35.

With reference to FIG. 1, schematic operations of the electronic pen device 1 according to the first embodiment are now described. In the electronic pen device 1 according to the first embodiment, the ball rotation sensor 22 first detects rotation of the ball 22a provided on the pen point. The X-directional acceleration sensor 23a and the Y-directional acceleration sensor 23b detect acceleration of the pen point. The contact state determination part 25 detects pressing force applied to the ball 22a, thereby determining whether the pen point is in a contact state or in a noncontact state with the entry plane. The detection results in the ball rotation sensor 22 and the acceleration sensor 23 and the result of determination by the contact state determination part 25 are input in the CPU 30.

On the basis of the detection results in the contact state determination part 25 and the ball rotation sensor 22, the CPU 30 measures movement loci (contact movement loci) of the pen point in the directions X and Y in the contact state of the pen point and the entry plane. On the basis of the detection results in the contact state determination part 25 and the acceleration sensor 23, the CPU 30 measures movement loci (noncontact movement loci) of the pen point in the directions X and Y in the noncontact state of the pen point and the entry plane.

Further, the CPU 30 calculates acceleration in the contact state from the contact movement locus obtained with the ball rotation sensor 22 and compares this acceleration with that detected by the acceleration sensor 23 in the same contact state, thereby calculating a detection error of the acceleration sensor 23. On the basis of the detection error of the acceleration sensor 23, the CPU 30 corrects the detection result in the acceleration sensor 23 in the noncontact state for obtaining a noncontact movement locus. On the basis of the obtained noncontact locus and the contact movement locus measured on the basis the detection result in the ball rotation sensor 22, the CPU 30 obtains a contact movement locus of the pen point for a single character while recognizing the character drawn with the pen point on the basis of the obtained contact movement locus for the single character. Further, the CPU 30 obtains a telephone number on the basis of a recognized character string and outputs the obtained telephone number to the telephone circuit 50 for allowing the telephone circuit 50 to call the destination of transmission.

As hereinabove described, the electronic pen device 1 according to the first embodiment obtains the contact movement locus of the pen point on the basis of the detection result in the ball rotation sensor 22 having relatively high accuracy in the contact state of the pen point and the entry plane requiring detection of a fine stroke while obtaining the noncontact movement locus of the pen point on the basis of the detection result in the acceleration sensor 23 in the noncontact state where the pen point and the entry plane separate from each other. Thus, it is possible to accurately obtain movement loci of a character, which cannot be written with one stroke, having a contact movement locus and a noncontact movement locus.

According to the first embodiment, further, it is possible to further improve the measurement accuracy for the noncontact movement locus by comparing the acceleration in the contact state obtained from the detection result in the ball rotation sensor 22 with the acceleration in the acceleration sensor 23 in the same contact state thereby correcting the detection result of acceleration in the noncontact state detected by the acceleration sensor 23 and measuring the noncontact movement locus. Consequently, the movement loci can be more accurately obtained.

As hereinabove described, the electronic pen device 1 according to the first embodiment comprises the telephone circuit 50, the microphone 52, the speaker 53 and the antenna 55. Thus, the electronic pen device 1 can be readily used as a portable telephone set, while the character is recognized on the basis of accurately obtained loci and hence it is possible to effectively prevent transmission to a wrong destination.

The details of operations of the electronic pen device (pen-type telephone set) 1 according to the first embodiment are now described with reference to FIGS. 2 to 5. Referring to a flow chart shown in FIG. 2, a timer is cleared at a step S1. This timer is employed for regarding that a single character is completely written when the pen point separates from the entry plane in excess of a constant time. Thereafter whether or not the timer makes a time-out is determined at a step S2. If the timer is determined as making no time-out at the step S2, whether the pen point is in contact with the entry plane (pen-down state) or not in contact with the entry plane (pen-up state) is determined at a step S3. If the pen point is determined as in the pen-down state at the step S3, processing of steps S4 to S8 is performed.

The processing of the steps S4 to S8 is performed in a period (contact state) when the contact state determination part 25 determines that the pen point is in contact with the entry plane. In this period, the ball rotation sensor 22 detects rotation of the ball 22a provided on the pen point, thereby obtaining movement loci (contact movement loci) in the directions X and Y, which are a set of (X, Y) coordinates, at a step S4. At a step S5, the information on the pen-down state (contact state) and the aforementioned (X, Y) coordinates are stored in a coordinate memory in a prescribed area of the memory 35. The contact movement loci are measured from when the pen point comes into contact with the entry plane until when the pen point separates from the entry plane. The movement loci may be obtained with the ball rotation sensor 22 in a method similar to that in the conventional input device employing a ball rotation sensor shown in FIGS. 10 to 13.

Figure 3:
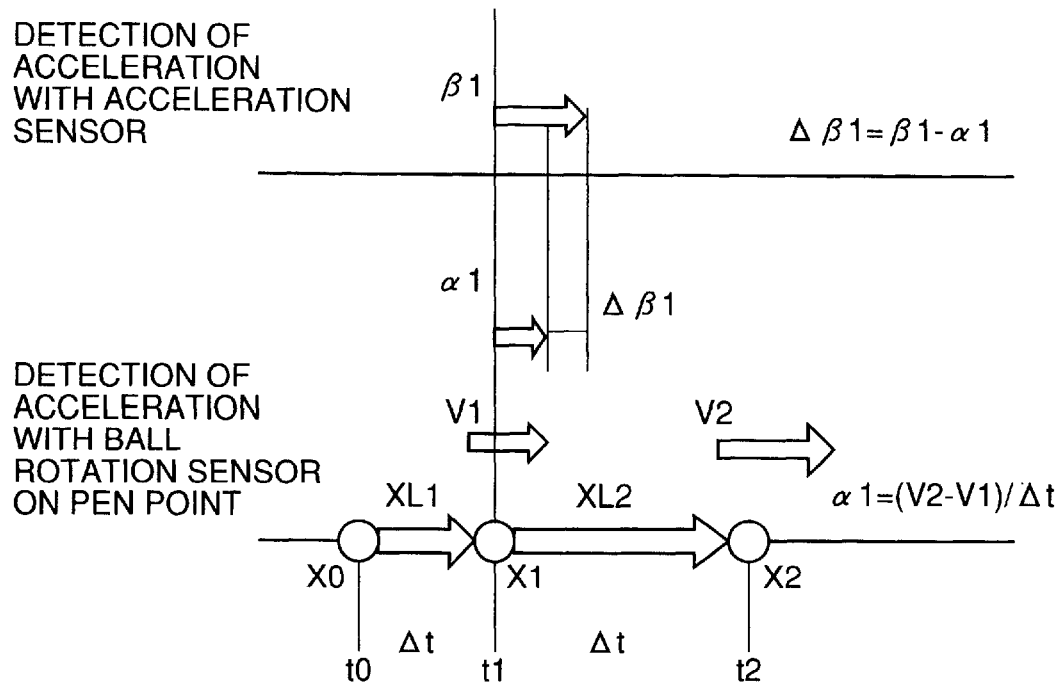
FIG. 3 is a model diagram for illustrating a method of obtaining an error in acceleration detected by an acceleration sensor of the electronic pen device according to the first embodiment.
Figure 4:
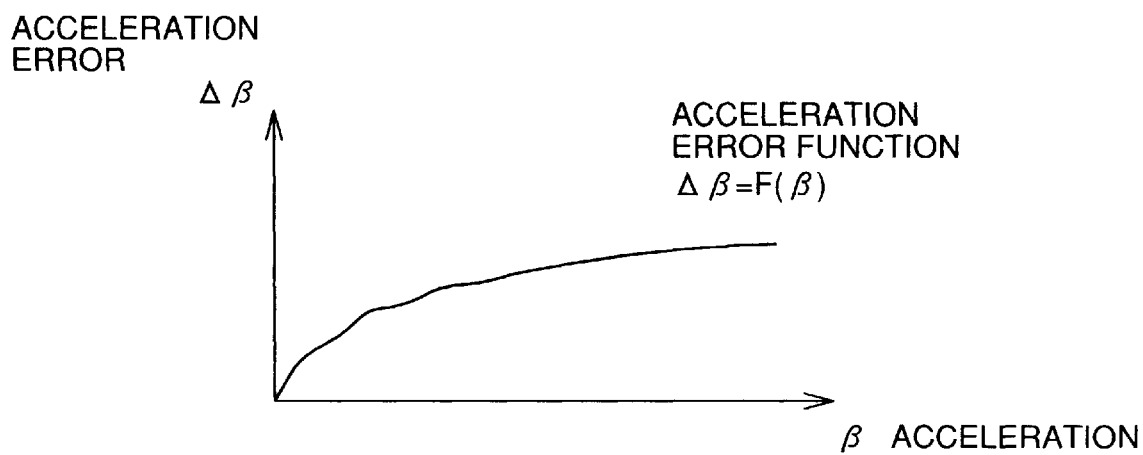
FIG. 4 is a graph showing an acceleration error function of the electronic pen device according to the first embodiment.

In the state (pen-down state) where the pen point is in contact with the entry plane, a timer for measuring a time in which the pen point separates from the entry plane is cleared at a step S6. Thereafter acceleration is calculated on the basis of the detection result in the ball rotation sensor 22 in the contact state at a step S7. In order to calculate acceleration α1 on the basis of the detection result in the ball rotation sensor 22, a velocity V1 is obtained from a movement distance XL1 in a prescribed time Δt, and a velocity V2 is obtained from a movement distance XL2 in a next prescribed time Δt, as shown in FIG. 3. Then, the acceleration α1 is obtained through the following equation (1):

$$\alpha 1 = (V2-V1)/\Delta t \tag{1}$$

Figure 8:
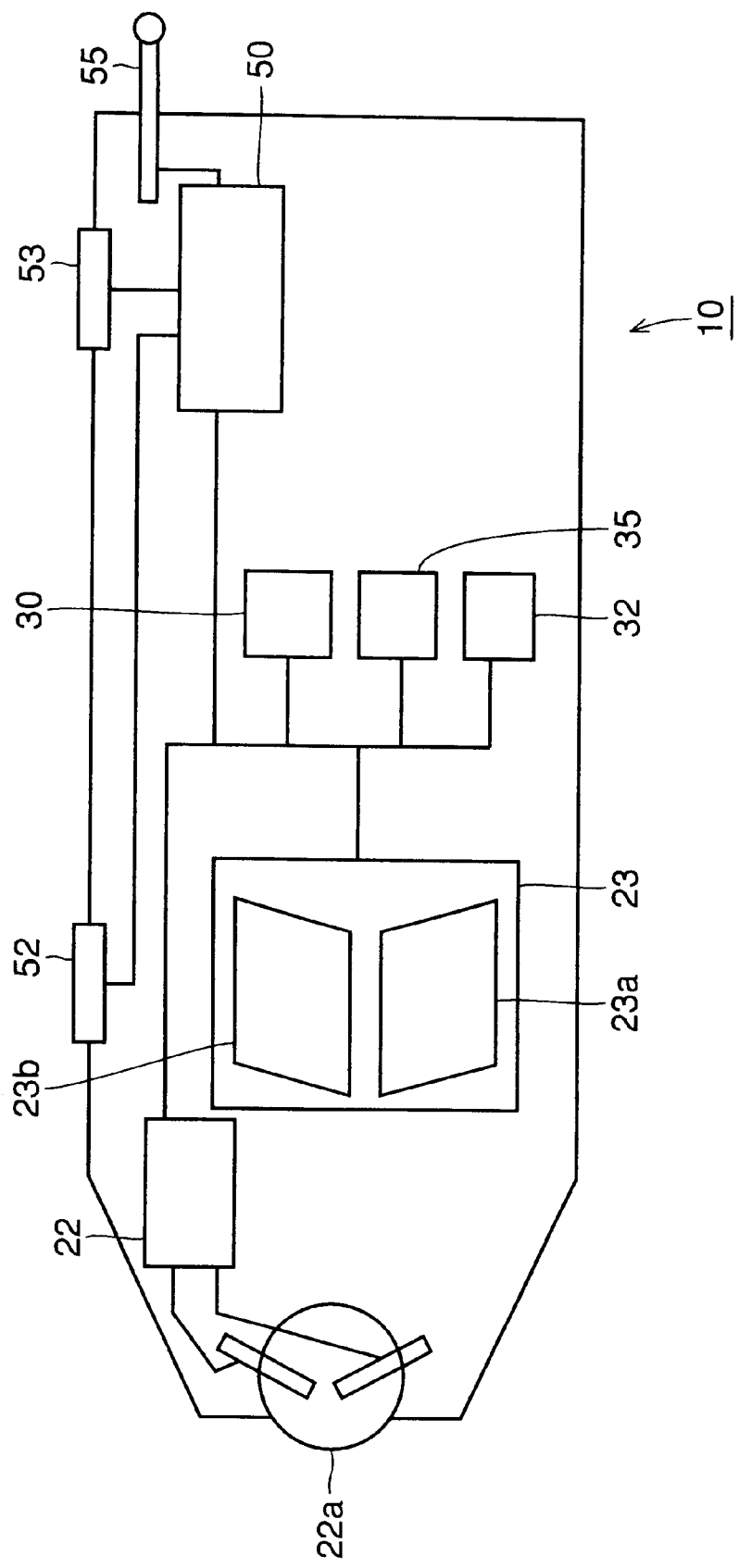
FIG. 8 is a schematic diagram showing the structure of an electronic pen device (pen-type telephone set) according to a second embodiment of the present invention.

Thereafter at a step S8 of the flow chart shown in FIG. 8, a detection error Δβ1 of the acceleration sensor 23 is calculated on the basis of the acceleration α1 obtained from the detection result in the ball rotation sensor 22 in the contact state and acceleration β1 detected by the acceleration sensor 23 in the same contact state through the following equation (2):

$$\Delta\beta 1 = \beta 1 - \alpha 1 \tag{2}$$

The calculated detection error Δβ1 of the acceleration sensor 23 is stored in an error table formed in the memory 35. The detection error Δβ1 of the acceleration sensor 23 thus obtained per small time is accumulated in the error table, which consequently accumulates an acceleration error function "Δβ=F(β)" shown in FIG. 4. In other words, the error table accumulates data univocally deciding the error Δβ from the detection result β in the acceleration sensor 23. On the basis of the data in the error table, the detection result in the acceleration sensor in a next noncontact state is corrected. More specifically, corrected acceleration α2 is calculated from the acceleration β detected by the acceleration sensor 23 in the noncontact state through the following equation (3):

$$\alpha 2 = \beta - F(\beta) \tag{3}$$

The correction based on the data of the error table may be performed per locus as in the first embodiment, or per character or per start of use.

Figure 2:
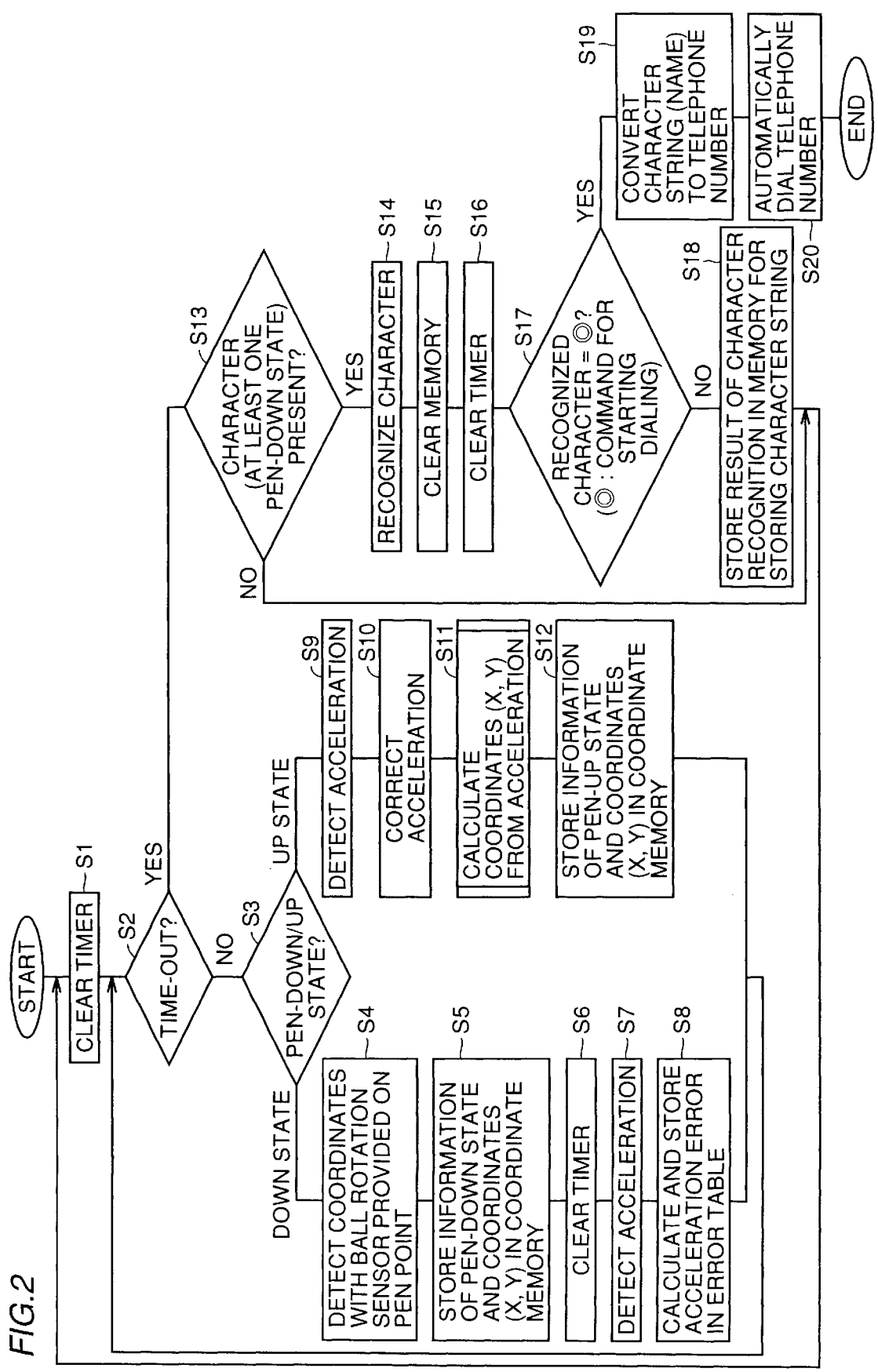
FIG. 2 is a flow chart for illustrating operations of the electronic pen device according to the first embodiment shown in FIG. 1.

If the pen point is determined as in the pen-up state (noncontact state) at the step S3 of the flow chart shown in FIG. 2, processing of steps S9 to S12 is performed.

The processing of the steps S9 to S12 is performed in a period (noncontact state) when the contact state determination part 25 determines that the pen point separates from the entry plane. In this period, the acceleration sensor 23 detects acceleration at the step S9. At the step S10, the detection result β of the acceleration is corrected through the above equation (3) with reference to the aforementioned error table, thereby calculating corrected acceleration α2. Then, at the step S11, movement loci (noncontact movement loci) in the directions X and Y, which are a set of (X, Y) coordinates, are obtained on the basis of the corrected acceleration α2. Thereafter the obtained noncontact movement loci and the information of the pen-up state are stored in the coordinate memory in the prescribed area of the memory 35 at the step S12.

Figure 5:
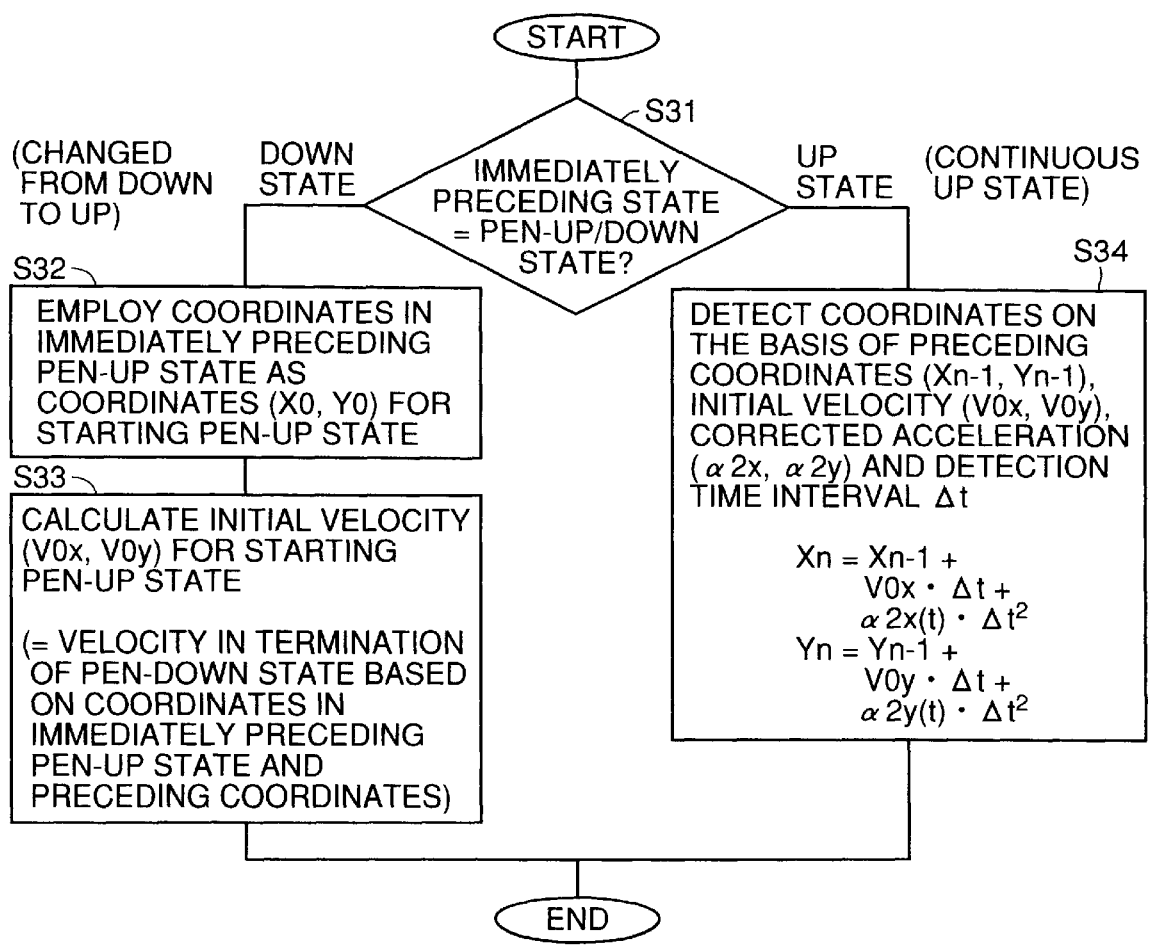
FIG. 5 is a flow chart for illustrating a method of obtaining (X, Y) coordinates from corrected acceleration $\alpha 2$ in the electronic pen device according to the first embodiment.

A principle of obtaining the (X, Y) coordinates from the corrected acceleration α2 at the step S11 is now described in more detail with reference to FIG. 5. At a step S31 of a flow chart shown in FIG. 5, whether the state immediately preceding the pen-up state (noncontact state) is a pen-up state (noncontact state) or a pen-down state (contact state) is determined. If the state immediately preceding the pen-up state is determined as the pen-down state at the step S31, processing of steps S32 and S33 is performed. This processing is performed when the pen point changes from the pen-down state (contact state) to the pen-up state (noncontact state), for ensuring continuity between start coordinates of the non-contact state and end coordinates of the contact state immediately preceding the noncontact state. In other words, this processing is performed for employing the end coordinates of the immediately preceding contact state as the start coordinates of the successive noncontact state.

In this case, the coordinates immediately preceding the pen-up state are regarded as the coordinates (X0, Y0) for starting the pen-up state at the step S32. Then, the initial velocity (V0x, V0y) for starting the pen-up state is calculated at the step S33. More specifically, the velocity in termination of the pen-down state is obtained on the basis of the difference between the coordinates immediately preceding the pen-up state and coordinates preceding these coordinates, for regarding the obtained velocity as the initial velocity (V0x, V0y) for starting the pen-up state.

Also when making transition from a pen-up state (noncontact state) to a pen-down state (contact state), processing similar to that of the steps S32 and S33 must be performed in order to ensure continuity between end coordinates in the noncontact state and start coordinates of the successive contact state.

If the state immediately preceding the pen-up state (noncontact state) is determined as a pen-up state (noncontact state) at the step S31, processing of a step S34 is performed. This processing is performed when the pen-up state (noncontact state) is continuous. In this case, coordinates (Xn, Yn) are calculated at the step S34 on the basis of preceding coordinates (Xn−1, Yn−1), the initial velocity (V0x, V0y), corrected acceleration (α2x, α2y) and a detection time interval Δt through the following equations (4) and (5):

$$Xn = Xn-1 + V0x \cdot \Delta t + \alpha 2x(t) \cdot \Delta t^2 \quad (4)$$

$$Yn = Yn-1 + V0y \cdot \Delta t + \alpha 2y(t) \cdot \Delta t^2 \quad (5)$$

The movement loci (noncontact movement loci) in the directions X and Y, which are a set of (X, Y) coordinates obtained in the aforementioned manner, and the information of the pen-up state are stored in the coordinate memory in the prescribed area of the memory 35 at the step S12 of the flow chart shown in FIG. 2.

If the time starting counting every termination of the contact state is determined as making a time-out at the step S2 of the flow chart shown in FIG. 2, it is regarded that a single character is completely written and processing of steps S13 to S21 is performed. In this case, whether or not a character (at least one pen-down state) is present at the step S13. If it is determined that a character is present, a movement locus (contact movement locus) in the contact state of the pen point for the single character is obtained on the basis of the data of contact movement loci and noncontact movement loci stored in the coordinate memory at the step S14, for performing character recognition on the basis of the obtained contact movement locus. The CPU 30 performs this character recognition.

In order to recognize the character from the contact movement locus, the coordinate points of the written character, the direction of the stroke on each coordinate point and the rotational direction characteristic on each coordinate point are detected. The direction of the stroke is detected with reference to four directions including "horizontal", "vertical", "right-downward oblique" and "left-downward oblique". As to the rotational direction characteristic, on which position the writing direction is bent clockwise or anticlockwise is detected. Character recognition is performed by comparing the detection results of the coordinate points, the direction of the stroke and the rotational direction characteristic with dictionary data.

Thus, also as to characters such as "g", "y" and "9" having generally similar forms and local differences, collation of the local differences can be reinforced with rotational direction characteristics by performing character recognition in consideration of not only directions of strokes but also rotational direction characteristics of writing. Also when manually writing such similar characters, therefore, the accuracy of character recognition can be improved. Further, the rotational direction characteristic is detected by simply separately arranging two characteristic spaces of "clockwise" and "anticlockwise", and hence the operation processing is not much complicated.

Figure 6:
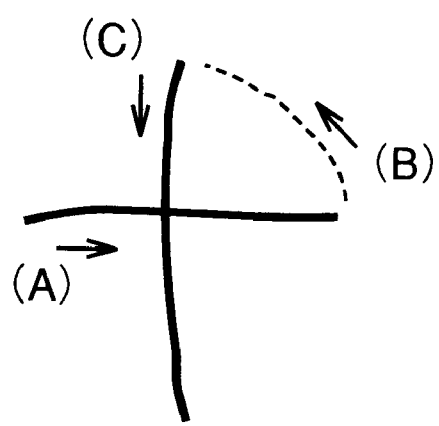
FIG. 6 is a schematic diagram showing an exemplary character accurately identifiable with the electronic pen device according to the first embodiment.

When employing the movement locus measuring method and the character recognition method of the electronic pen device according to the first embodiment, a character shown in FIG. 6, which cannot be written with one stroke, having both of a contact movement locus and a noncontact movement locus can be accurately recognized. Referring to FIG. 6, solid lines show coordinate detection parts (contact movement loci) with the ball rotation sensor 22, and a dotted line shows a coordinate detection part (noncontact movement locus) with the acceleration sensor 23. In order to write the character "+" shown in FIG. 6, the pen point is first brought into contact with the entry plane (contact state) to draw the horizontal line (A). Then, the pen point is separated from the entry plane (noncontact state) and moved to the start point for the vertical line (B). Finally, the pen point is brought into contact with the entry plane (contact state) to draw the vertical line (C). When applying the movement locus measuring method and the character recognition method according to the first embodiment to the loci (A, C) in the contact state and the locus (B) in the noncontact state, the character "+" shown in FIG. 6 can be accurately recognized.

Figure 7:
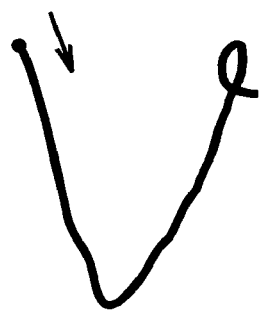
FIG. 7 is a schematic diagram showing another exemplary character accurately identifiable with the electronic pen device according to the first embodiment.

Also as to a character "V" shown in FIG. 7, which can be written with one stroke, formed by only a contact movement locus, the ball rotation sensor 22 having relatively high accuracy can accurately measure the contact movement locus thereby consequently improving the accuracy of character recognition.

When character recognition is terminated at the step S14 of the flow chart shown in FIG. 2, the data of the movement loci subjected to character recognition are deleted from the area for storing coordinate data in the memory 35 at the step S15. The timer is cleared at the step S16. Thereafter whether or not the recognized character is a character (◎) prompting a telephone call is determined at the step S17. If the recognized character is not the character (◎) prompting a telephone call, the recognized character is stored in a character storage memory in a prescribed area of the memory 35 at the step S18.

If the recognized character is determined as the character (◎) prompting a telephone call at the step S17, the name of a person or a company forming a character string stored previously to the currently recognized character (◎) is converted to a telephone number at the step S19. At the step S20, a command for calling the telephone number is issued to the telephone circuit 50. Thus, the electronic pen device (pen-type telephone set) 1 according to the first embodiment makes a call to the destination, similarly to an ordinary telephone set.

Second Embodiment

Referring to FIG. 8, an electronic pen device (pen-type telephone set) 10 according to a second embodiment of the present invention is basically similar in structure to the first embodiment shown in FIG. 1. In the second embodiment, however, the contact state determination part 25 in the structure of the first embodiment is omitted. When the contact state determination part 25 is thus omitted, a CPU 30 determines whether a ball 22a is in a contact state (pen-down state) or in a noncontact state (pen-up state) with an entry plane. In other words, the CPU 30 forms contact state determination means (contact state determination part) according to the present invention in the second embodiment.

Figure 9:
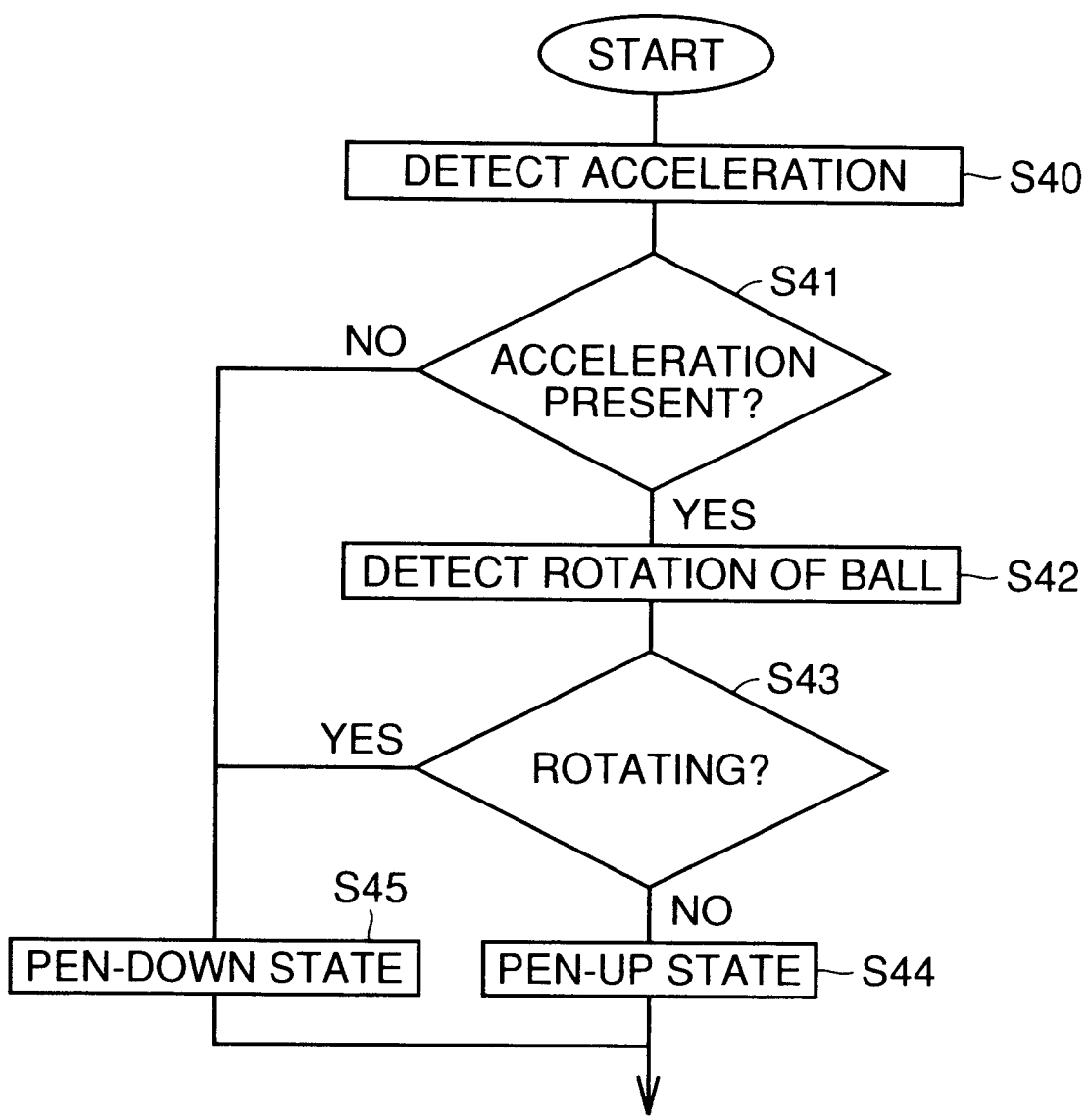
FIG. 9 is a flow chart for illustrating a contact state determination method in the electronic pen device according to the second embodiment shown in FIG. 8.
Figure 10:
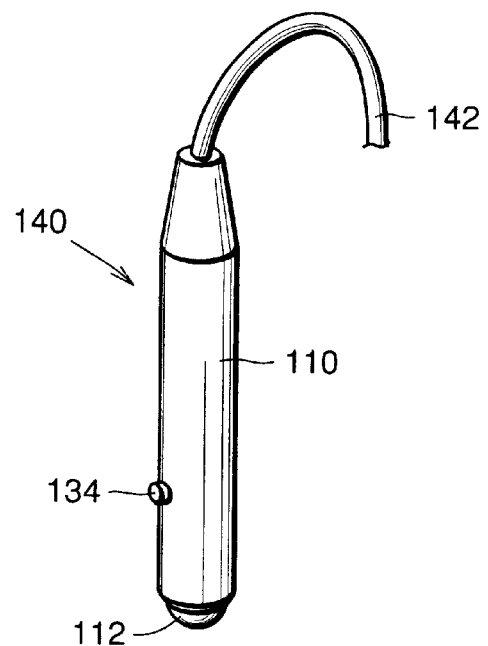
FIG. 10 is a perspective view showing the appearance of a conventional input device employing a ball rotation sensor.
Figure 11:
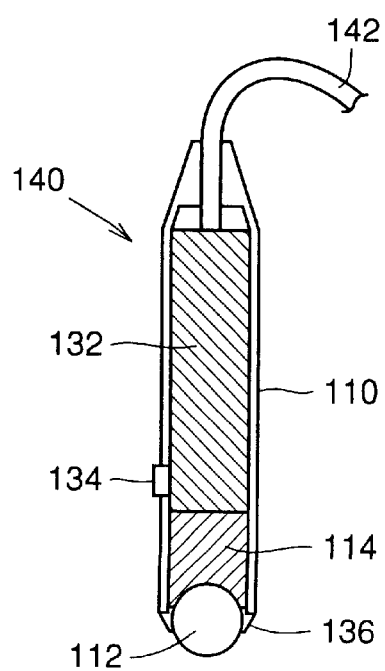
FIG. 11 is a sectional view showing the internal structure of the conventional input device employing a ball rotation sensor shown in FIG. 10.

More specifically, an acceleration sensor 23 first detects acceleration at a step S40 of a flow chart shown in FIG. 9. At a step S41, whether or not acceleration is present is determined. If absence of acceleration is determined, the pen-down state (contact state) is determined at a step S45. If presence of acceleration is determined, on the other hand, rotation of the ball 22a is further detected at a step S42. Further, whether or not the ball 22a is rotating is determined at a step S43. If the ball 22a is determined as rotating, the pen-down state (contact state) is determined at the step S45. If the ball 22a is determined as not rotating, on the other hand, the pen-up state (noncontact state) is determined at a step S44.

Thus, in the electronic pen device 10 according to the second embodiment, the CPU 30 determines whether the ball 22a is in the contact state (pen-down state) or in the noncontact state (pen-up state) with the entry plane.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic pen device comprising:

first measuring means for measuring movement loci of a pen point in directions X and Y on the basis of a detection result in a ball rotation sensor detecting rotation of a ball provided on said pen point;

contact state determination means for determining whether said pen point is in a contact state or in a noncontact state with an entry plane;

second measuring means for measuring movement loci of said pen point in said directions X and Y on the basis of acceleration detected by an acceleration sensor;

movement locus operation means for obtaining a contact movement locus of said pen point on the basis of a measurement result in said first measuring means when said contact state determination means determines that said pen point is in said contact state with said entry plane while obtaining a noncontact movement locus of said pen point on the basis of a measurement result in said second measuring means when said contact state determination means determines that said pen point is in said noncontact state with said entry plane;

correction means for correcting said measurement result from said second measuring means when said pen point is in said noncontact state based on a measurement result received from said first measuring means determined when the pen point is in a prior contact state;

a telephone circuit for making communication with the destination of transmission/receiving, a microphone for inputting a transmission a speaker for outputting a receiving tone, and call control means obtaining a telephone number of the destination of transmission on the basis of a character string recognized, by said character recognition, and means arid outputting said obtained telephones number to said telephone circuit for allowing said telephone circuit to make a call.

2. The electronic pen device in accordance with claim 1, wherein said movement locus operation means employs end coordinates of said noncontact movement locus obtained on the basis of a measurement result in said second measuring means in immediately preceding said noncontact state as start coordinates of each, said contact movement locus, and employs end coordinates of said contact movement locus obtained on the, basis of a measurement, result in said first measuring means in immediately preceding said contact state as start coordinates of each said noncontact movement locus.

3. The electronic pen device in accordance with claim 1, wherein said contact state determination means determines whether said pen point is in said contact state or in said noncontact state with said entry plane on the basis of a measurement result of pressing force applied from said pen point.

4. The electronic pea device in accordance with claim 1, wherein said contact state determination means determines whether said pen point is in said contact state or in said noncontact state with said entry plane on the basis of presence/absence of rotation of said ball detected by said ball rotation sensor and presence/absence of acceleration detected by said acceleration sensor.

5. The electronic pen device in accordance with claim 1, further comprising character recognition means recognizing a character drawn with said pen point on said entry plane on the basis of said contact movement locus for a single character obtained by said movement locus operation means.

6. A telephone set employing an electronic pen device, comprising:

first measuring means for measuring movement loci of a pen point in directions X and Y on the basis of a detection result in a ball rotation sensor detecting rotation of a ball provided on said pen point;

contact state determination means for determining whether said pen point is in a contact state or in a noncontact state with an entry plane;

second measuring means for measuring movement loci of said pen point in said directions X and Y on the basis of acceleration detected by an acceleration sensor;

movement locus operation means for obtaining a contact movement locus of said pen point on the basis of a measurement result in said first measuring means when said contact state determination means determines that said pen point is in said contact state with said entry plane while obtaining a noncontact movement locus of said pen point on the basis of a measurement result in said second measuring means when said contact state determination means determines that said pen point is in said noncontact state with said entry plane;

correction means for correcting said measurement result from said second measuring means when said pen point is in said noncontact state based on a measurement result received from said first measuring means determined when the pen point is in a prior contact state;

character recognition for means recognizing a character drawn with said pen point on said entry plane on the basis of said contact movement locus for a single character obtained by said movement locus operation means;

a telephone circuit for making communication with the destination of transmission/receiving;

a microphone for inputting a transmission tone;

a speaker for outputting a receiving tone; and call control means for obtaining a telephone number of the destination of transmission on the basis of a character string recognized by said character recognition means and outputting said obtained telephone number to said telephone circuit for allowing said telephone circuit to make a call.

7. The telephone set employing an electronic pen device in accordance with claim 6, wherein said movement locus operation means employs end coordinates of said noncontact movement locus obtained on the basis of a measurement result in said second measuring means in immediately preceding said noncontact state as start coordinates of each said contact movement locus, and employs end coordinates of said contact movement locus obtained on the basis of a measurement result in said first measuring means in immediately preceding said contact state as start coordinates of each said noncontact movement locus.

8. An electronic pen device comprising:

a first measuring part for measuring movement loci of a pen point in directions X and Y on the basis of a detection result in a ball rotation sensor detecting rotation of a ball provided on said pen point;

a contact state determination part determining whether said pen point is in a contact state or in a noncontact state with an entry plane;

a second measuring part for measuring movement loci of said pen point in said directions X and Y on the basis of acceleration detected by an acceleration sensor;

a movement locus operation part for obtaining a contact, movement locus of said pen point on the basis of a measurement result in said first measuring part when said contact state determination part determines that said pen point is in said contact state with said entry plane while obtaining a noncontact movement locus of said pen point on the basis of a measurement result in said second measuring part when said contact state determination part determines that said pen point is in said noncontact state with said entry plane;

correction part for correcting said measurement result from said second measuring part when said pen point is in said noncontact state based on a measurement result received from said first measuring part determined when the pen point is in a prior contact state;

a telephone circuit for making communication with the destination of transmission/receiving, a microphone for inputting a transmission tone, a speaker for outputting a receiving tone, and a call control part obtaining a telephone number of the destination of transmission on the basis of a character string recognized by said character recognition part and outputting said obtained telephone number to said telephone circuit for allowing said telephone circuit to make a call.

9. The electronic pen device in accordance with claim 8, wherein said movement locus operation part employs end coordinates of said noncontact movement locus obtained on the basis of a measurement result in said second measuring part in immediately preceding said noncontact state as start coordinates of each said contact movement locus, and employs end coordinates of said contact movement locus obtained on the basis of a measurement result in said first measuring part in immediately preceding said contact state as start coordinates of each said noncontact movement locus.

10. The electronic pen device In accordance with claim 8, wherein said contact state determination part determines whether said pen point is in said contact state or in said noncontact state with said entry plane on the basis of a measurement result of pressing force applied from said pen point.

11. The electronic pen device in accordance with claim 1, wherein said contact state determination part determines whether said pen point is in said contact state or in said noncontact state with said entry plane on the basis of presence/absence of rotation of said ball detected by said ball rotation sensor and presence/absence of acceleration detected by said acceleration sensor.

12. The electronic pea device in accordance with claim 1, further comprising a character recognition part recognizing a character drawn with said pen point on said entry plane on the basis of said contact movement locus for a single character obtained by said movement locus operation part.

13. A telephone set employing an electronic pen device, comprising:

a first measuring part for measuring movement loci of a pen point in directions X and, Y on the basis of a detection result in a ball rotation sensor detecting rotation of a ball provided on said pen point;

a contact, state determination part determining whether said pen point is in a contact state or in a noncontact state with an entry plane;

a second measuring part for measuring movement loci of said pen point in said directions X and Y on the basis of acceleration detected by an acceleration sensor;

a movement locus operation part for obtaining a contact movement locus of said pen point on the basis of a measurement result in said first measuring part when said contact state determination part determines that said pen point is in said contact state with said entry plane while obtaining a noncontact movement locus of said pen point on the basis of a measurement result in said second measuring part when said contact state determination part determines that said pen point is in said noncontact state with said entry plane; and correction part for correcting said measurement result in said second measuring part when said pen point is in said noncontact state based on a measurement result received from said first measuring part determined when the pen point is in a prior contact state;

a character recognition part recognizing a character drawn with said pen point on said entry plane on the basis of said contact movement locus for a single character obtained by said movement locus operation part; a telephone circuit for making communication with the destination of transmission/receiving;

a microphone for inputting a transmission tone;

a speaker for outputting a receiving tone; and a call control part obtaining a telephone number of the destination of transmission on the basis of a character string recognized by said character recognition part arid outputting said obtained telephone number to said telephone circuit for allowing said telephone circuit to make a call.

14. The telephone set employing an electronic pen device in accordance with claim 13, wherein said movement locus operation part employs end coordinates of said noncontact movement locus obtained on the basis of a measurement result in said second measuring part in immediately preceding said noncontact state as start coordinates of each said contact movement locus, and employs end coordinates of said contact movement locus obtained on the basis of a measurement result in said first measuring part in immediately preceding said contact state as start coordinates of each said noncontact movement locus.

* * * * *